United States Patent
Ideshio et al.

(10) Patent No.: US 9,266,530 B2
(45) Date of Patent: Feb. 23, 2016

(54) CONTROL DEVICE FOR HYBRID VEHICLE

(75) Inventors: Yukihiko Ideshio, Nisshin (JP);
Terufumi Miyazaki, Toyota (JP); Yuji Inoue, Nisshin (JP); Shingo Eto, Gamagori (JP); Yousuke Michikoshi, Miyoshi (JP); Akihiro Sato, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/363,339

(22) PCT Filed: Dec. 8, 2011

(86) PCT No.: PCT/JP2011/078387
§ 371 (c)(1),
(2), (4) Date: Sep. 12, 2014

(87) PCT Pub. No.: WO2013/084333
PCT Pub. Date: Jun. 13, 2013

(65) Prior Publication Data
US 2015/0039167 A1 Feb. 5, 2015

(51) Int. Cl.
*B60L 9/00* (2006.01)
*B60K 6/20* (2007.10)
*B60K 1/02* (2006.01)
(Continued)

(52) U.S. Cl.
CPC ............... *B60W 20/108* (2013.01); *B60K 6/48* (2013.01); *B60K 6/547* (2013.01); *B60W 10/02* (2013.01); *B60W 10/06* (2013.01); *B60W 10/08* (2013.01); *B60W 20/1088* (2013.01);
(Continued)

(58) Field of Classification Search
USPC ............................... 701/22; 180/65.21; 477/3
See application file for complete search history.

(56) References Cited

U.S. PATENT DOCUMENTS 6,691,807 B1 * 2/2004 Bhavsar et al. ............ 180/65.21
7,325,638 B1 * 2/2008 Belloso et al. ............... 180/69.6
(Continued)

FOREIGN PATENT DOCUMENTS

JP 11-173174 6/1999
JP 2000-350310 12/2000
(Continued)

*Primary Examiner* — Thomas G Black
*Assistant Examiner* — Tyler Paige
(74) *Attorney, Agent, or Firm* — Finnegan, Henderson, Farabow, Garrett & Dunner, LLP

(57) ABSTRACT

A control device of a hybrid vehicle including an electric motor and an engine as drive force sources, the hybrid vehicle being configured to execute engine running using the engine as the drive force source for running and motor running using the electric motor as the drive force source for running with the engine stopped, the control device having a predefined running performance oriented running mode such as a sport running mode and a predefined large drive force running mode with a lower requirement degree of start acceleration performance as compared to the running performance oriented running mode, in the predefined running performance oriented running mode, the motor running being inhibited, the engine running being performed in an operation range in which the motor running is normally performed, and the engine being retained in an operating state at the time of vehicle stop, and in the predefined large drive force running mode, the motor running being inhibited, the engine running being performed in the operation range in which the motor running is normally performed, and the engine being stopped at the time of vehicle stop.

6 Claims, 7 Drawing Sheets

(51) Int. Cl.
  *B60W 20/00* (2006.01)
  *B60K 6/48* (2007.10)
  *B60K 6/547* (2007.10)
  *B60W 10/06* (2006.01)
  *B60W 10/08* (2006.01)
  *B60W 10/02* (2006.01)

(52) U.S. Cl.
  CPC ............ *B60W 20/40* (2013.01); *Y02T 10/6221* (2013.01); *Y02T 10/6286* (2013.01); *Y10S 903/93* (2013.01)

(56) References Cited

U.S. PATENT DOCUMENTS

| | | | |
|---|---|---|---|
| 2008/0265609 A1* | 10/2008 | Orrell et al. | 296/107.07 |
| 2008/0293538 A1* | 11/2008 | Saito et al. | 477/3 |
| 2008/0300744 A1* | 12/2008 | Katsuta et al. | 701/22 |
| 2009/0055073 A1* | 2/2009 | Matsubara et al. | 701/102 |
| 2011/0192666 A1* | 8/2011 | Schmid et al. | 180/165 |
| 2012/0015772 A1* | 1/2012 | Kira et al. | 475/149 |
| 2012/0090911 A1* | 4/2012 | Matheson | 180/292 |
| 2013/0138288 A1* | 5/2013 | Nickolaou et al. | 701/23 |
| 2013/0275023 A1* | 10/2013 | Gregg et al. | 701/102 |
| 2014/0250929 A1* | 9/2014 | Takahashi et al. | 62/115 |
| 2015/0039167 A1* | 2/2015 | Ideshio et al. | 701/22 |

FOREIGN PATENT DOCUMENTS

| | | |
|---|---|---|
| JP | 2004-92655 | 3/2004 |
| JP | 2009-149161 | 7/2009 |

* cited by examiner

| RUNNING MODE | ENGINE | MG | K0 CLUTCH | L/U CLUTCH |
|---|---|---|---|---|
| ENGINE RUNNING | OPERATED | FREE/ POWER RUNNING | ENGAGED | ENGAGED/ RELEASED |
| MOTOR RUNNING | STOPPED | POWER RUNNING | RELEASED | ENGAGED |

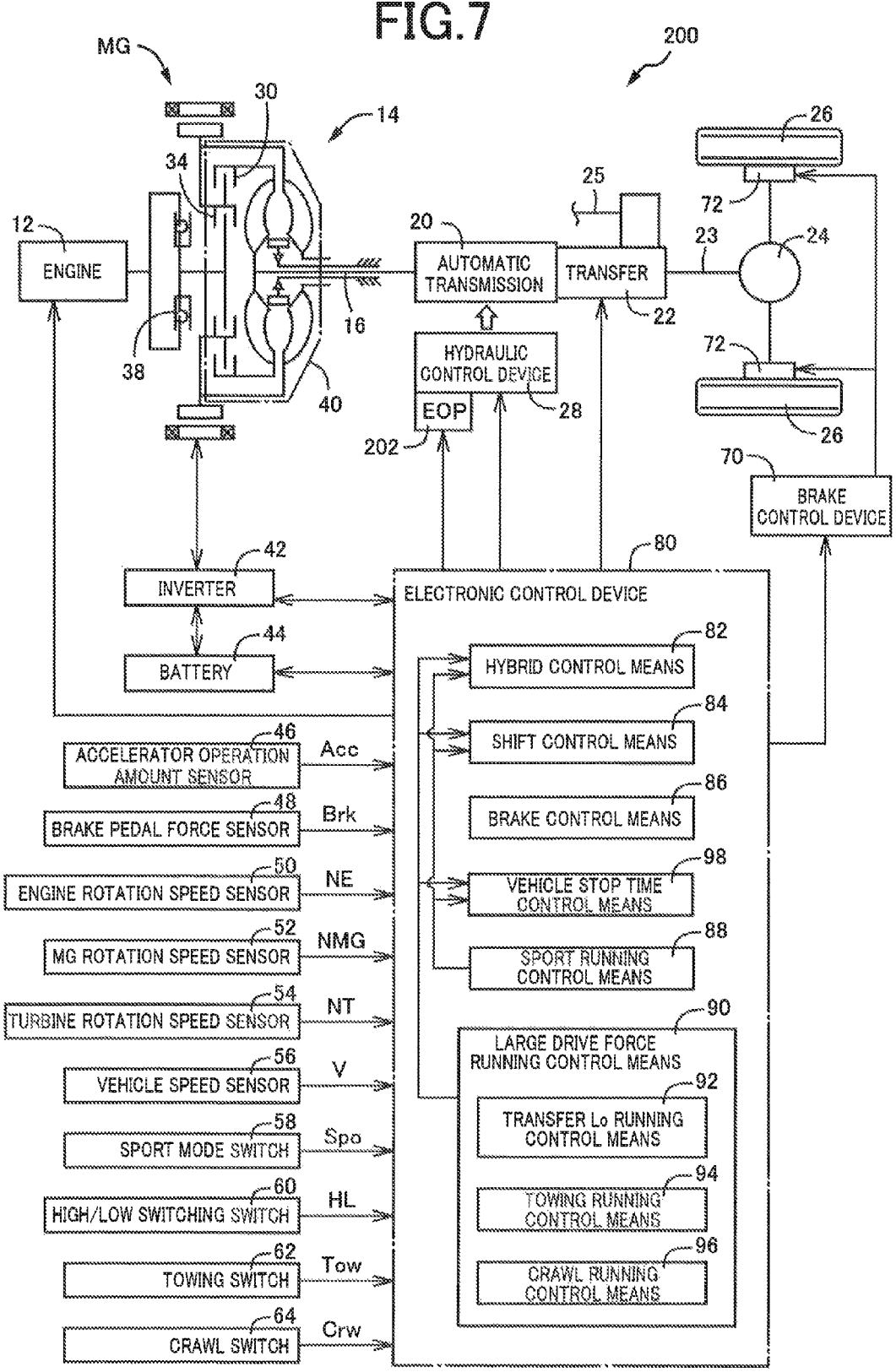

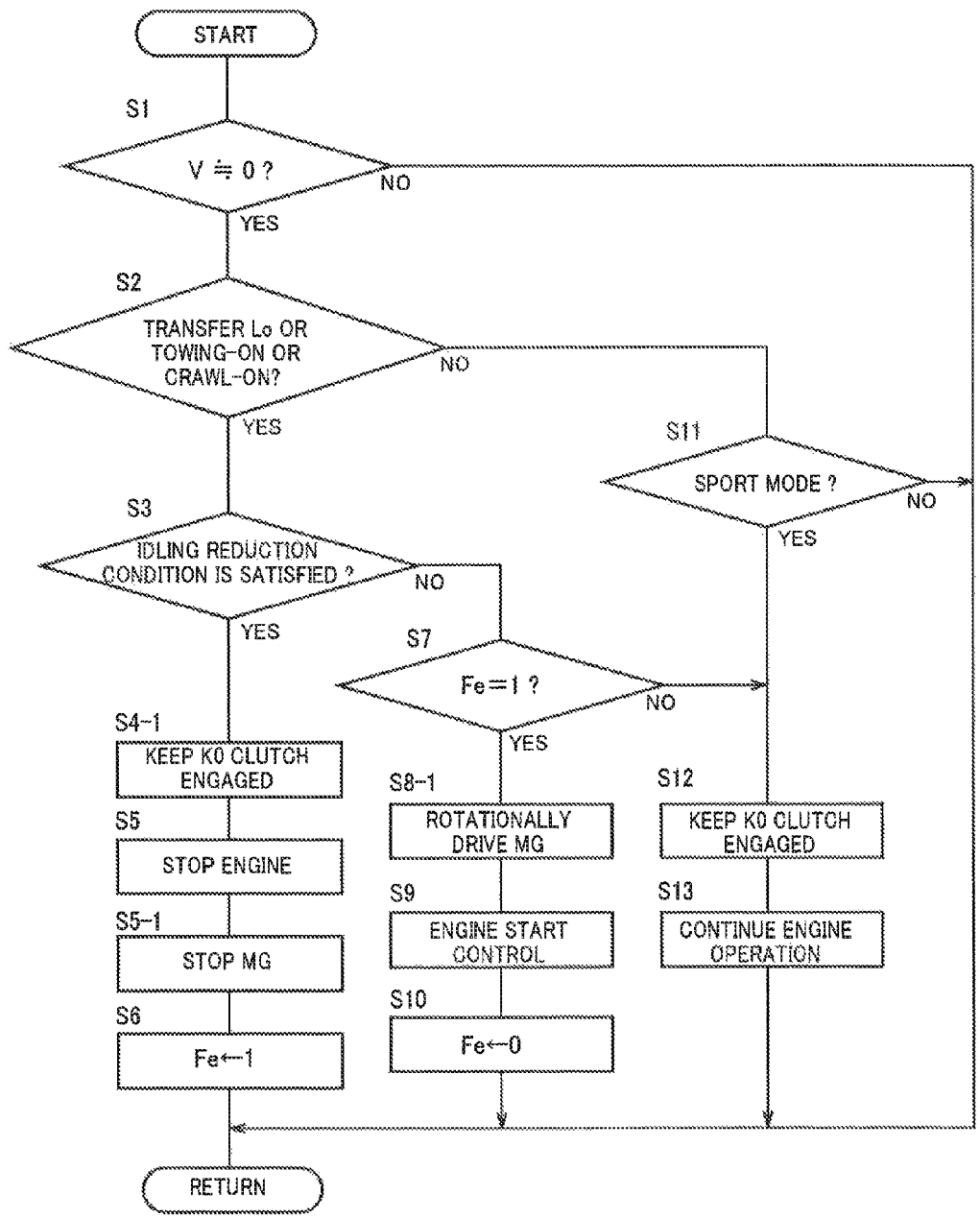

_US 9,266,530 B2_

CONTROL DEVICE FOR HYBRID VEHICLE

CROSS-REFERENCE TO RELATED APPLICATIONS

This application is a national phase application of International Application No. PCT/JP2011/078387, filed Dec. 8, 2011, the content of which is incorporated herein by reference.

TECHNICAL FIELD

The present invention relates to a hybrid vehicle control device and particularly to an improvement in a large drive force running mode for performing engine running in an operation range in which motor running is normally performed.

BACKGROUND ART

A hybrid vehicle is known that includes an electric motor and an engine as drive force sources and that is capable of engine running using the engine as the drive force source for running and motor running using the electric motor as the drive force source for running with the engine stopped. A hybrid vehicle described in Patent Document 1 is an example thereof and performs the motor running in a lower load range and the engine running in a higher load range and, if it is requested to perform running with importance attached to power performance, the hybrid vehicle performs the engine running regardless of a magnitude of load and can keep the engine in an operating state even at the time of vehicle stop so as to acquire excellent drive force responsiveness.

PRIOR ART DOCUMENT

Patent Document

Patent Document 1: Japanese Laid-Open Patent Publication No. 2004-92655

SUMMARY OF THE INVENTION

Problem to be Solved by the Invention

However, although the acquisition of excellent drive force responsiveness preferably matches a driver's intention in the case of a running performance oriented sport mode or a manual shift mode, the excellent responsiveness is not necessarily needed in terms of start acceleration performance, while a large drive force is required, in the case of a transfer Lo running mode in which a Hi-Lo switchable auxiliary transmission disposed in a front/rear-wheel distribution transfer is set to Lo or a towing running mode of running for towing a towed vehicle, for example. Always keeping the engine in the operating state even in such a case is wasteful and is not preferable in terms of fuel efficiency.

The present invention was conceived in view of the situations and it is therefore an object of the present invention to improve fuel efficiency while properly ensuring a large drive force in relation to a large drive force running mode in which a large drive force is required although excellent responsiveness is not necessarily needed in terms of start acceleration performance.

Means for Solving the Problem

To achieve the object, the first aspect of the invention provides a control device of a hybrid vehicle including an electric motor and an engine as drive force sources, the hybrid vehicle being configured to execute engine running using the engine as the drive force source for running and motor running using the electric motor as the drive force source for running with the engine stopped, wherein (a) in a predefined running performance oriented running mode such as a sport running mode, the motor running is inhibited, the engine running is performed in an operation range in which the motor running is normally performed, and the engine is retained in an operating state at the time of vehicle stop, and wherein (b) in a predefined large drive force running mode with a lower requirement degree of start acceleration performance as compared to the running performance oriented running mode, the motor running is inhibited, the engine running is performed in the operation range in which the motor running is normally performed, and the engine is stopped at the time of vehicle stop.

The second aspect of the invention provides the control device of a hybrid vehicle recited in the first aspect of the invention, wherein the large drive force running mode includes at least one of a transfer Lo running mode in which a Hi-Lo switchable auxiliary transmission disposed in a front/rear-wheel distribution transfer is set to Lo, a towing running mode of running for towing a towed vehicle, and crawl running mode of automatically controlling the engine and wheel brakes for running without an accelerator operation and a brake operation of a driver.

The third aspect of the invention provides the control device of a hybrid vehicle recited in the first or second aspect of the invention, wherein at the time of vehicle, start from a vehicle stop state with the engine stopped in the large drive force running mode, the engine is started to use a drive force from the engine for the vehicle start.

The fourth aspect of the invention provides the control device of a hybrid vehicle recited in any one of the first to third aspects of the invention, comprising (a) an engine connecting/disconnecting device decoupling the engine from a drive force transmission path, wherein the electric motor is disposed closer to the drive force transmission path than the engine connecting/disconnecting device, wherein the engine connecting/disconnecting device is connected during the engine running, wherein (b) at the time of vehicle stop in the large drive force running mode, the engine connecting/disconnecting device is interrupted and the engine is stopped, and wherein at the time of vehicle start, the engine connecting/disconnecting device is connected while the electric motor is rotationally driven to crank and start the engine.

The fifth aspect of the invention provides the control device of a hybrid vehicle recited in any one of the first to third aspects of the invention, comprising (a) an engine connecting/disconnecting device decoupling the engine from a drive force transmission path, wherein the electric motor is disposed closer to the drive force transmission path than the engine connecting/disconnecting device, wherein the engine connecting/disconnecting device decoupling the engine from a drive force transmission path, wherein the electric motor is disposed closer to the drive force transmission path than the engine connecting/disconnecting device, wherein the engine connecting/disconnecting device is connected during the engine running, wherein (b) at the time of vehicle stop in the large drive force running mode, the engine is stopped with the engine connecting/disconnecting device kept connected, and wherein at the time of vehicle start, the electric motor is rotationally driven with the engine connecting/disconnecting device connected to crank and start the engine.

The sixth aspect of the invention provides the control device of a hybrid vehicle recited in the fifth aspect of the invention, wherein at the time of vehicle stop in the large drive force running mode, the engine connecting/disconnecting device is maintained in a connected state until the time of vehicle start.

Effects of the Invention

In the control device of a hybrid vehicle as described above, in the large drive force running mode, the engine running is performed in the operation range in which the motor running is normally performed and, therefore, a large drive force from the engine is smoothly acquired and a driving operation is facilitated when a large drive force is required. At the time of vehicle stop in the large drive force running mode, the engine is stopped and, therefore, fuel efficiency is improved. Since the engine is stopped, a time until the acquisition of the large drive force from the engine is elongated by an engine start time at the subsequent vehicle start; however, when the requirement for the start acceleration performance is low, it is unlikely to be against a driver's intention or to give a feeling of discomfort, and the driving operability and the fuel efficiency can properly be satisfied at the same time during the large drive force running mode.

On the other hand, the running performance oriented running mode with a higher requirement for the start acceleration performance is included separately from the large drive force running mode, and the engine is retained in the operating state at the time of vehicle stop in the running performance oriented running mode. As a result, excellent start acceleration performance can be acquired. In other words, in the large drive force running mode with a lower requirement degree for the start acceleration performance, the large drive force from the engine is promptly acquired through the engine running and the engine is stopped at the time of vehicle stop to achieve an improvement in fuel efficiency, while in the running performance oriented sport running mode with a higher requirement degree of the start acceleration performance, the large drive force from the engine is promptly acquired through the engine running and the engine is retained in the operating state even at the time of vehicle stop, and therefore, excellent running performance matching the driver's intention is acquired, including the start acceleration performance.

The second aspect of the invention is the case where the large drive force running mode includes the transfer Lo running mode in which an auxiliary transmission disposed in a front/rear-wheel distribution transfer is set to Lo, the towing running mode of running for towing a towed vehicle, and the crawl running mode of automatically controlling the engine and the wheel brakes for running without an accelerator operation and a brake operation of a driver. In these running modes, the excellent responsiveness is not necessarily needed in terms of start acceleration performance, while a large drive force is required, and therefore, the engine is stopped at the time of vehicle stop to achieve an improvement in fuel efficiency, while the large drive force from the engine is promptly acquired during the running and the driving operation is facilitated.

In the third aspect of the invention, at the time of vehicle start from the vehicle stop state with the engine stopped in the large drive force running mode, the engine is started to use the drive force of the engine for the vehicle start and, therefore, although a response delay exists until the start of the engine, the large drive force from the engine can promptly be acquired and the driving operation is facilitated.

The fourth aspect of the invention is the case where the engine connecting/disconnecting device decoupling the engine from the drive force transmission path is comprised, at the time of vehicle stop in the large drive force running mode, the engine connecting/disconnecting device is interrupted and the engine is stopped, and at the time of vehicle start, the engine connecting/disconnecting device is connected while the electric motor is rotationally driven to crank and start the engine. As a result, the engine rotation speed can promptly be raised for starting the engine, and the deterioration in the start acceleration performance can be suppressed to the minimum while the improvement in fuel efficiency is realized by the engine stop.

The fifth aspect of the invention is the case where the engine connecting/disconnecting device decoupling the engine from a drive force transmission path is comprised, at the time of vehicle stop in the large drive force running mode, the engine is stopped with the engine connecting/disconnecting device kept connected, and at the time of vehicle start, the engine is cranked and started by the electric motor with the engine connecting/disconnecting device connected. As a result, the control is easier than the case of providing start control of the engine while the engine connecting/disconnecting device is connected, and the shift to the engine running mode can smoothly be made.

In the fifth aspect of the invention, the sixth aspect of the invention is the case where the engine connecting/disconnecting device is maintained in the connected state from a vehicle stop to a vehicle start. As a result, the engine can immediately be cranked by the electric motor in accordance with an engine start instruction, and the responsiveness at the time of engine start is improved.

BRIEF DESCRIPTION OF THE DRAWINGS

FIG. 7 is a diagram of a general configuration of a drive system of another hybrid vehicle to which the present invention is preferably applied.

FIG. 8 is a flow chart for explaining an operation of a vehicle stop time control means in the example of FIG. 7.

MODE FOR CARRYING OUT THE INVENTION

Figure 1:
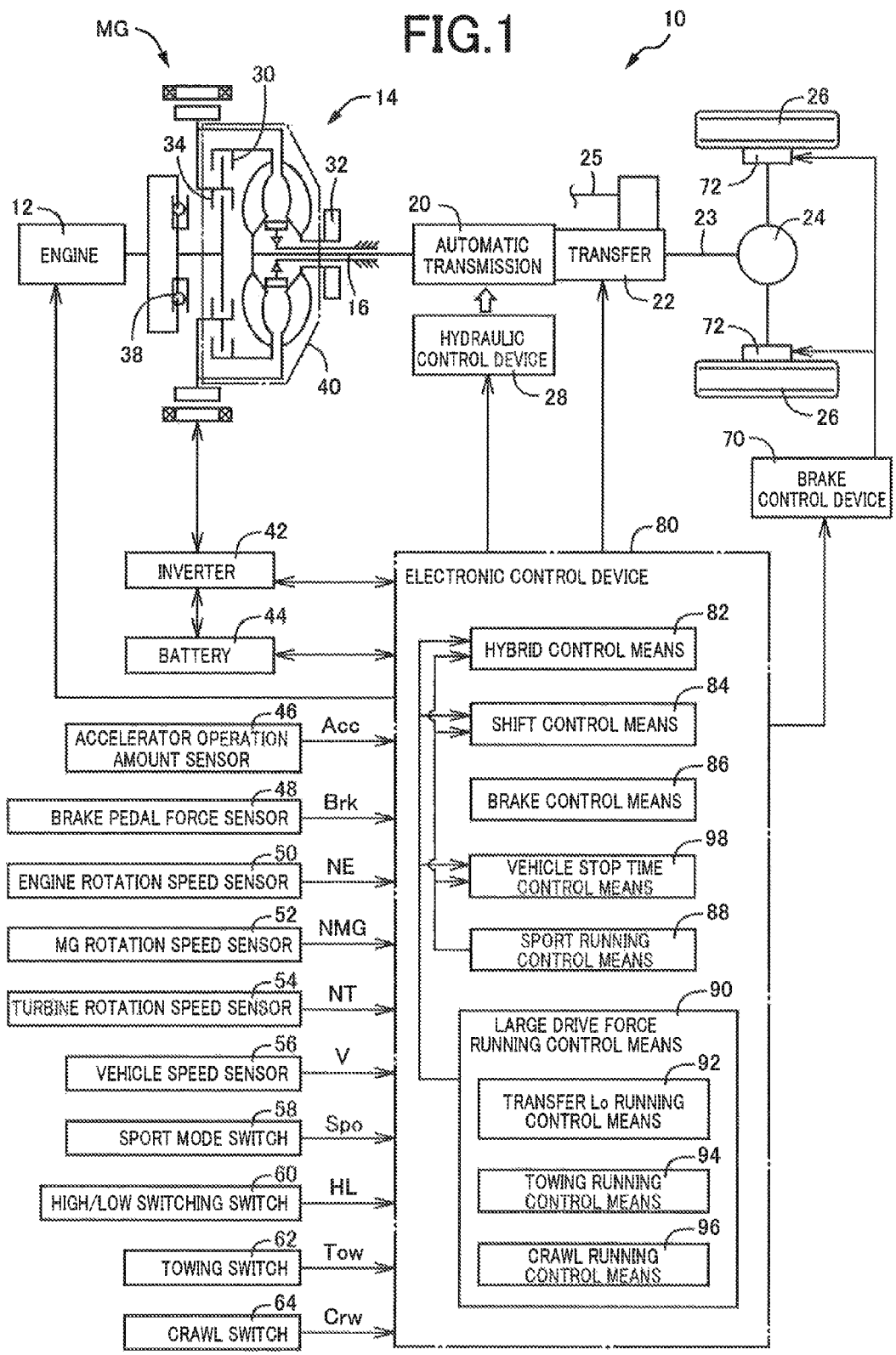
FIG. 1 is a diagram of a general configuration of a drive system of a hybrid vehicle to which the present invention is preferably applied.

Although the present invention is preferably applied to a hybrid vehicle having an engine and an electric motor connected through an engine connecting/disconnecting device, the present invention is applicable to various hybrid vehicles of a parallel type, a series type, etc. The engine is an internal combustion engine combusting fuel to generate power. Although the electric motor is preferably a motor generator also usable as an electric generator, the electric motor may not have the function of an electric generator. Although the engine connecting/disconnecting device is a friction engagement clutch or brake, various means can be employed that are capable of connecting and interrupting a power transmission between the electric motor and the engine.

Engine running is performed by using at least the engine as a drive force source and the electric motor can be used for assistance or can always be used. Motor running is performed by using only the electric motor as the drive force source for running with the engine stopped. The engine running and the motor running are switched in accordance with a switching map defined by using an operation state such as a vehicle speed and an accelerator operation amount (output request amount) as parameters in such a manner that the motor running is performed in an operation range of lower load while the engine running is performed in an operation range of higher load, for example.

A large drive three running mode is a predefined running mode in which a drive force larger than usual is required although a requirement degree of start acceleration performance is low, for example, and is a mode enabling a vehicle to run with a drive force larger than usual. Enabling a vehicle to run with a drive force larger than usual means that the vehicle is capable of miming with a drive force larger than usual by using the engine or both the engine and the electric motor as the drive force source for running in an operation range in which only the electric motor is normally used for running. Although the large drive force running mode is, for example, a transfer Lo running mode, a towing running mode, and a crawl running mode described in the second aspect of the invention, another mode can be set in which a larger drive force is required along with a lower requirement degree of start acceleration performance. For example, a running mode in a lock state inhibiting differential motion of a front/rear-wheel distribution transfer can be set as the large drive force running mode. The large drive force running mode may arbitrarily be selectable by a switch operation of a driver. Although the present invention is preferably applied to a front/rear-wheel drive vehicle having a front/rear-wheel distribution transfer, the present invention may be applied to a hybrid vehicle driving only the front wheels or the rear wheels and a front/rear-wheel drive vehicle driving the front wheels and the rear wheels by separate drive force sources.

In the large drive force running mode, the motor running is inhibited and only the engine running is performed and, for example, a shift line of an automatic transmission may be changed toward the higher vehicle speed side to make an upshift more difficult and a downshift easier, or control characteristics of a throttle valve opening degree relative to an accelerator operation amount may be changed toward the higher throttle valve opening degree side as needed, so that a larger drive force can be acquired from the same driving operation. In the crawl running mode, the engine and wheel brakes are automatically controlled without an accelerator operation and a brake operation of a driver for running at a low vehicle speed equal to or less than about 10 km/h, for example, and the driver can concentrate on a steering operation and more easily perform the driving operation.

Although the engine is stopped at the time of vehicle stop in the large drive force running mode, the engine may not necessarily always be stopped and is desirably stopped when a predetermined idling reduction condition is satisfied such as when an accelerator is OFF (not operated), when a brake is ON (in braking operation), and when an engine water temperature is equal to or greater than a predetermined value, for example. The engine may be stopped not only in the complete vehicle stop state when the vehicle speed is 0 km/h but also at a low vehicle speed when the vehicle speed is 2 to 3 km/h, for example. The engine can be stopped during coasting with the accelerator turned off, in addition to the time of vehicle stop.

At the time of vehicle start from the vehicle stop state with the engine stopped in the large drive force running mode, the engine is desirably started to use the drive force from the engine for the vehicle start as in the third aspect of the invention. "Using the drive force from the engine for the vehicle start" means that the engine is started as promptly as possible to acquire the drive force from the engine. If a direct injection engine is included that directly injects fuel into a cylinder, the engine can be started by itself through fuel injection and ignition or can be started by using the cranking by the electric motor at the same time. In the implementation of the first aspect of the invention, the control at the time of vehicle start from the vehicle stop state with the engine stopped can take various forms depending on details of control of the large drive force running mode, such as starting the vehicle with the drive force of the electric motor, connecting the engine connecting/disconnecting device once a predetermined vehicle speed equal to or less than 10 km/h is achieved, for example, and cranking and starting the engine to make the shift to the engine running.

In the fourth aspect of the invention, since the engine connecting/disconnecting device is interrupted at the time of vehicle stop in the large drive force running mode to stop the engine and the engine connecting/disconnecting device is connected while the electric motor is rotationally driven to crank and start the engine at the time of vehicle start, the drive force from the engine is acquired from the beginning of the vehicle start or immediately after the vehicle start, and this includes the case of starting the vehicle with the drive force of the electric motor and connecting the engine connecting/disconnecting device in a vehicle start process at, for example, 10 km/h or less to start the engine.

In the fifth aspect of the invention, since the engine is stopped with the engine connecting/disconnecting device kept connected at the time of vehicle stop in the large drive force running mode and the engine is cranked and started by the electric motor with the engine connecting/disconnecting device connected at the time of vehicle start, the drive force from the engine is acquired from the beginning of the vehicle start or immediately after the vehicle start. Because the engine is stopped with the engine connecting/disconnecting device kept connected, the electric motor is also stopped and, therefore, for example, if the engine connecting/disconnecting device is a hydraulic engagement device, an electric oil pump must be used for generating a predetermined oil pressure. The fifth aspect of the invention includes the case of starting the vehicle with the drive force of the electric motor and providing engine start control such as fuel injection in a vehicle start process at, for example, 10 km/h or less to start the engine.

Although the running performance oriented running mode may be achieved by simply inhibiting the motor running and performing only the engine running, a shift line of the automatic transmission may be changed toward the higher vehicle speed side to make an upshift more difficult and a downshift easier, or control characteristics of a throttle valve opening degree relative to an accelerator operation amount may be changed toward the higher throttle valve opening degree side. Such a running performance oriented running mode is a conventionally known running mode referred to as a power mode or a sport mode, or a manual shift mode in which a gear stage or a gear ratio of the automatic transmission is changed by a manual operation. However, a mode considered to have a lower requirement for start acceleration performance out of these running modes may be classified as the large drive force running mode so as to stop the engine at the time of vehicle stop.

First Example

An example of the present invention will now be described in detail with reference to the drawings.

FIG. 1 is a diagram of a general configuration of a drive system of a hybrid vehicle 10 to which the present invention is preferably applied. The hybrid vehicle 10 includes an engine 12 that is an internal combustion engine such as a gasoline engine and a diesel engine combusting fuel to generate power, and a motor generator MG acting as an electric motor and an electric generator as drive force sources. The output of the engine 12 and the motor generator MG is transmitted from a torque converter 14 that is a fluid transmission device via a turbine shaft 16 to an automatic transmission 20 and then distributed by a transfer 22 for front/rear-wheel distribution with an auxiliary transmission to front and rear wheels. A drive force distributed toward the rear wheels is transmitted through a rear-wheel output shaft 23 and a differential gear device 24 to left and right rear drive wheels 26, and a drive force distributed toward the front wheels is transmitted from a front-wheel output shaft 25 through a differential gear device etc. not depicted to left and right front drive wheels. The torque converter 14 includes a lockup clutch (L/U clutch) 30 directly coupling a pump impeller with a turbine impeller, and the pump impeller is integrally connected to a mechanical oil pump 32 and is mechanically rotationally driven by the engine 12 and the motor generator MG to generate and supply oil pressure to an hydraulic control device 28. The lockup clutch 30 is a hydraulic frictional engagement device and is engaged or released by an electromagnetic hydraulic control valve, a switching valve, etc. disposed in the hydraulic control device 28. The motor generator MG corresponds to an electric motor.

A K0 clutch 34 is disposed between, and directly couples, the engine 12 and the motor generator MG via a damper 38. The K0 clutch 34 is a single-plate or multi-plate friction clutch frictionally engaged by a hydraulic cylinder and is disposed in an oil bath condition within an oil chamber 40 of the torque converter 14. The K0 clutch 34 is a hydraulic friction engagement device and acts as an engine connecting/disconnecting device connecting and interrupting the engine 12 to/from a drive force transmission path, and the motor generator MG is disposed closer to the drive force transmission path than the K0 clutch 34. The is rotor generator MG is connected via an inverter 42 to a battery 44.

The automatic transmission 20 is a stepped automatic transmission of a planetary gear type etc., having a plurality of gear stages with different gear ratios established depending on engaged/released states of a plurality of hydraulic friction engagement devices (clutches and brakes) and is subjected to shift control by electromagnetic hydraulic control valves, switching valves, etc. disposed in the hydraulic control device 28. A neutral state interrupting the power transmission can be established by releasing an input clutch C1 not depicted.

Figure 2:
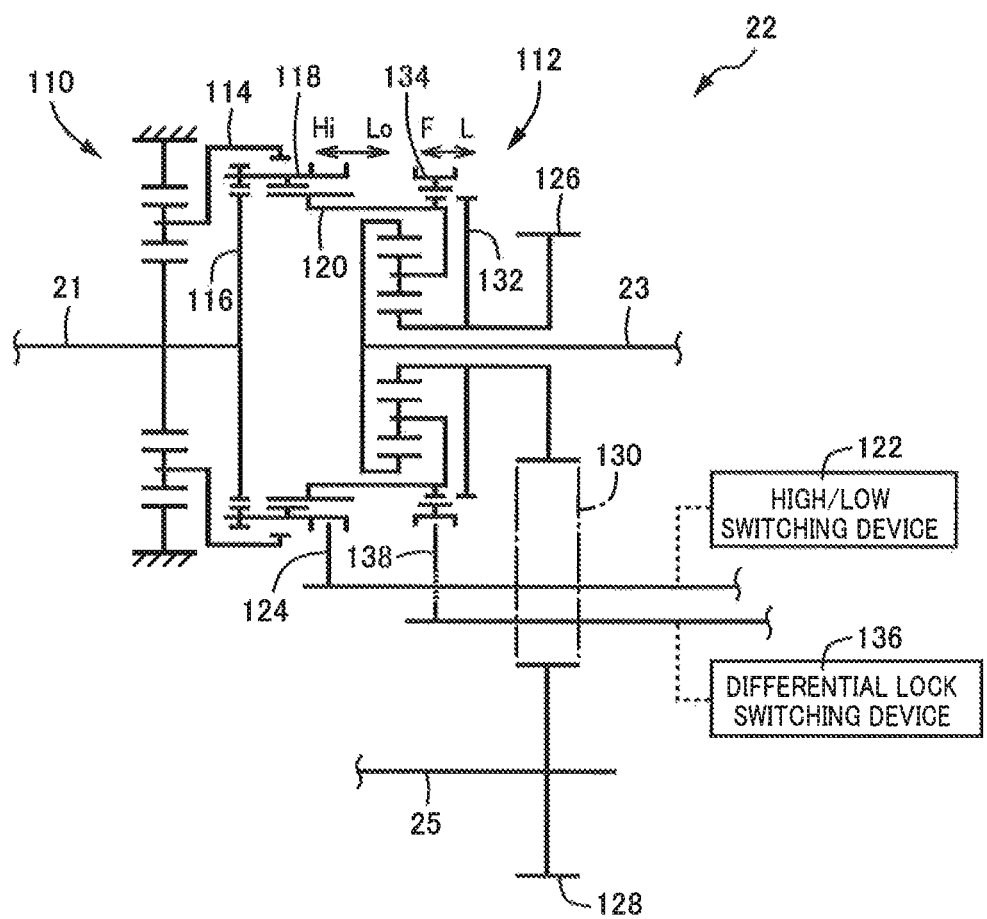
FIG. 2 is a schematic for explaining an example of a transfer with an auxiliary transmission included in the hybrid vehicle of FIG. 1.

The transfer 22 for front/rear-wheel distribution with an auxiliary transmission is configured as described in FIG. 2, for example. FIG. 2 is a schematic of the transfer 22 and includes a planetary gear type auxiliary transmission 110 and a planetary gear type distribution mechanism 112 such that rotation is transmitted from the automatic transmission 20 through an intermediate shaft 21 to the auxiliary transmission 110. The auxiliary transmission 110 is a single pinion type planetary gear device with the intermediate shaft 21 coupled to a sun gear and has a ring gear fixed to a case and a carrier 114 rotating at reduced speed relative to the intermediate shaft 21. The intermediate shaft 21 is also coupled to a direct coupling member 116 and either the carrier 114 or the direct coupling member 116 is alternatively connected via a clutch sleeve 118 to an input member 120 of the distribution mechanism 112. The clutch sleeve 118 is moved by a high/low switching shift fork 124 driven by a high/low switching device 122 in the left/right direction of FIG. 2 and when the clutch sleeve 118 is moved to a Hi (high) position on the left side as depicted in FIG. 2, the direct coupling member 116 is connected to the input member 120 to achieve a Hi state in which the input member 120 is directly rotated and, when the clutch sleeve 118 is moved to a Lo (low) position on the right side, the carrier 114 is connected to the input member 120 to achieve a Lo state of rotation at reduced speed. The Hi state corresponds to transfer Hi, and the Lo state corresponds to transfer Lo. The high/low switching device 122 is electrically driven by an electronic control device 80 (see FIG. 1) to switch the auxiliary transmission 110 between the Hi state and the Lo state. The transfer 22 only needs to be capable of the Hi-Lo switching, and the Lo state and the Hi state may correspond to direct rotation and rotation at increased speed, respectively.

The distribution mechanism 112 is a single pinion type planetary gear device with the input member 120 coupled to a carrier and has a ring gear coupled to the rear-wheel output shaft 23 and a sun gear coupled to a front-wheel sprocket 126. The front-wheel sprocket 126 is coupled via a chain 130 to a sprocket 128 disposed on the front-wheel output shaft 25 and the output shaft 25 is rotationally driven as the sun gear rotates. The sun gear is also coupled to a lock member 132 such that the sun gear is directly coupled via a clutch sleeve 134 to the input member 120. The clutch sleeve 134 is moved by a differential lock switching shift fork 138 driven by a differential lock switching device 136 in the left/right direction of FIG. 2 and when the clutch sleeve 134 is moved to an F (free) position on the left side as depicted in FIG. 2, the connection between the lock member 132 and the input member 120 is interrupted to achieve a free state allowing a differential rotation of the distribution mechanism 112 and, when the clutch sleeve 134 is moved to an L (lock) position on the right side, the lock member 132 is directly coupled to the input member 120 and the distribution mechanism 112 is integrally rotated, achieving a lock state preventing the differential rotation. The differential lock switching device 136 is electrically driven by the electronic control device 80 to switch the distribution mechanism 112 between the free state and the lock state. Although not depicted, the distribution mechanism 112 is disposed with a differential limitation mechanism of a Torsen type etc, mechanically limiting differential motion even in the free state.

Returning to FIG. 1, the rear drive wheels 26 and the front drive wheels not depicted are disposed with respective wheel brakes 72 mechanically generating braking torque with a hydraulic cylinder, and the braking torque (oil pressure) is controlled by a brake control device 70. The brake control device 70 includes an electromagnetic hydraulic control valve, a switching valve, etc., and electrically controls the braking torque of the wheel brakes 72 in accordance with a brake control signal output from the electronic control device 80.

The electronic control device 80 includes a so-called microcomputer having a CPU, a ROM, a RAM, an I/O interface, etc. to execute signal processes in accordance with a program stored in advance in the ROM, while utilizing a temporary storage function of the RAM. The electronic control device 80 is supplied with a signal indicative of an operation amount (accelerator operation amount) Acc of an accelerator pedal from an accelerator operation amount sensor 46 and is supplied with a signal indicative of a brake petal tread force (brake pedal force) Brk from a brake pedal force sensor 48. The accelerator operation amount ace corresponds to an output request amount of a driver. The electronic control device 80 is also supplied with signals indicative of a rotation speed (engine rotation speed) NE of the engine 12, a rotation speed (MG rotation speed) NMG of the motor generator MG, a rotation speed (turbine rotation speed) NT of the turbine shaft 16, and a vehicle speed V, from an engine rotation speed sensor 50, an MG rotation speed sensor 52, a turbine rotation speed sensor 54, a vehicle speed sensor 56, respectively.

The electronic control device 80 is connected to a sport mode switch 58, a high/low switching switch 60, a towing switch 62, and a crawl switch 64. The sport mode switch 58 is a switch used when a driver selects a sport running mode enabling running with importance attached to the running performance including the start acceleration performance, and is supplied with a sport selection signal Spo meaning that the sport running mode is selected. The high/low switching switch 60 is a switch used when a driver switches Hi-Lo of the auxiliary transmission 110 of the transfer 22, and is supplied with a high/low switching signal HL indicative of Hi or Lo. The towing switch 62 is a switch used when a driver selects a towing running mode of running for towing a towed vehicle, and is supplied with a towing selection signal Tow meaning that the towing running mode is selected. A towing detection switch detecting presence/absence of a towed vehicle may be provided instead of or in addition to the towing switch 62 to determine the towing running mode from either or both of the signals. The crawl switch 64 is a switch used when a driver selects a crawl running mode of automatically controlling the engine 12, the motor generator MG, and the wheel brakes 72 for running at low speed without an accelerator operation and a brake operation of the driver, and is supplied with a crawl selection signal Crw meaning that the crawl running mode is selected. The sport running mode is a running performance oriented running mode with a high requirement degree of the start acceleration performance. All of the transfer Lo running mode, the towing running mode, and the crawl running mode with the auxiliary transmission 110 switched to the La state for running are the predefined large drive force running mode in which a drive force larger than usual is required although the requirement degree of the start acceleration performance is lower than the running performance oriented running mode. The electronic control device 80 is further supplied with various pieces of information necessary for other various controls.

The electronic control device 80 functionally includes a hybrid control means 82, a shift control means 84, a brake control means 86, a sport running control means 88, a large drive force running control means 90, and a vehicle stop time control means 98. The hybrid control means 82 controls operations of the engine 12 and the motor generator MG to switch a plurality of running modes such as an engine running mode using the engine 12 as the power source for running and a motor running mode using only the motor generator MG as the power source for running depending on an operation state(s) such as the accelerator operation amount Acc and the vehicle speed V for running. For example, the vehicle runs in the motor running mode in a lower load range (e.g., a range indicated by a dashed-two dotted line of FIG. 4) associated with a lower accelerator operation amount Acc and a lower vehicle speed and, when the lower load range is exceeded, the vehicle runs in the engine running mode. The dashed-two dotted line of FIG. 4 is an example of a switching map for switching the running modes depending on the operation state.

Figures 3, 4:
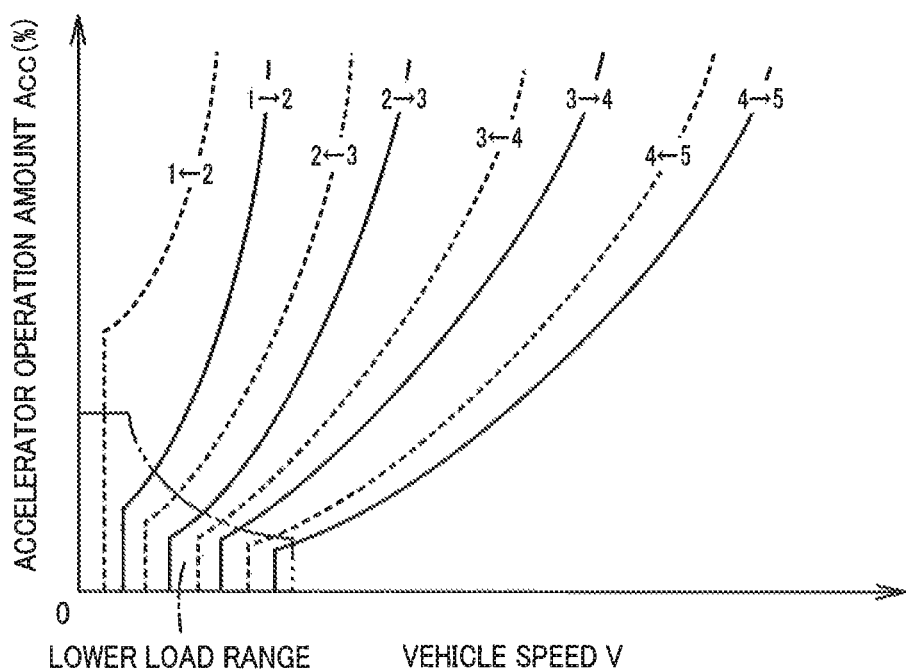
FIG. 3 is a diagram for explaining a plurality of running modes related to a drive force source of the hybrid vehicle of FIG. 1.
FIG. 4 is a diagram for explaining an example of a shift map related to an automatic transmission of the hybrid vehicle of FIG. 1, and in which a plurality of gear stages are automatically switched depending on the operation state.

FIG. 3 is a diagram for explaining the operating states of the portions in the engine running mode and the motor running mode and, in the engine running mode, the K0 clutch 34 is engaged to connect the engine 12 to the drive force transmission path while the lockup clutch 30 is engaged or released in accordance with a switching map defined in advance by using the operation state(s) such as the accelerator operation amount Acc and the vehicle speed V as parameters. The motor generator MG is basically in a free (free rotation) state with motor torque=0 and is subjected to power running control as needed to assist the drive force. In the motor running mode, the K0 clutch 34 is released to interrupt the engine 12 from the power transmission path while the lockup clutch 30 is maintained in the engaged state. If the motor running mode is switched to the engine running mode, the K0 clutch 34 is engaged to crank the engine 12 while start control such as fuel injection and ignition is provided to start the engine 12. To suppress variation in the drive force due to a load at the time of cranking of the engine 12, the torque of the motor generator MG is desirably increased by a torque corresponding to the load. At the time of vehicle stop, the motor generator MG is operated at a predetermined rotation speed to generate a predetermined creep torque via the torque converter 14 while a predetermined oil pressure is output from the mechanical oil pump 32 to maintain a predetermined hydraulic friction engagement device of the automatic transmission 20 etc. in the engaged state.

The shift control means 84 controls the electromagnetic hydraulic control valve, a switching valve, etc. disposed in the hydraulic control device 28 to switch the engaged/released state of a plurality of hydraulic friction engagement devices (clutches and brakes) of the automatic transmission 20, thereby switching a plurality of gear stages of the automatic transmission 20 in accordance with a shift map (switching condition) defined in advance by using the operation state(s) such as the accelerator operation amount Acc and the vehicle speed V as parameters. FIG. 4 depicts an example of a shift map stored in advance by using the vehicle speed V and the accelerator operation amount Acc as parameters in the case of five forward speeds from a first speed gear stage "1" a fifth speed gear stage "5", and the shift map is defined such that a gear stage on the lower speed side with a larger gear ratio is established as the vehicle speed V becomes lower or the accelerator operation amount Acc becomes larger. Solid lines and broken lines of FIG. 4 are upshift lines and downshift lines, respectively, and are disposed with predetermined hysteresis. The shift control means 84 also switches the gear stages in accordance with a shift request from a driver's manual operation if a manual shift mode is selected.

The brake control means 86 controls the brake control device 70 depending on a request braking torque from a brake pedal depressing operation etc., so as to acquire the request braking torque. In other words, the brake control means 86 controls the wheel brakes 72 of the wheels such that the overall request braking torque required depending on the brake pedal force Brk, the vehicle speed V, etc is distributed toward the rear drive wheels 26 and the front drive wheels not depicted so as to acquire a predetermined braking torque from each of the front and rear wheels. The brake control means 86 can utilize not only the braking torque of the wheels brakes 72 but also the braking torque from regenerative control (also referred to as electric generation control) of the motor generator MG so as to achieve a predetermined request braking torque with the both braking torques.

Figure 5:
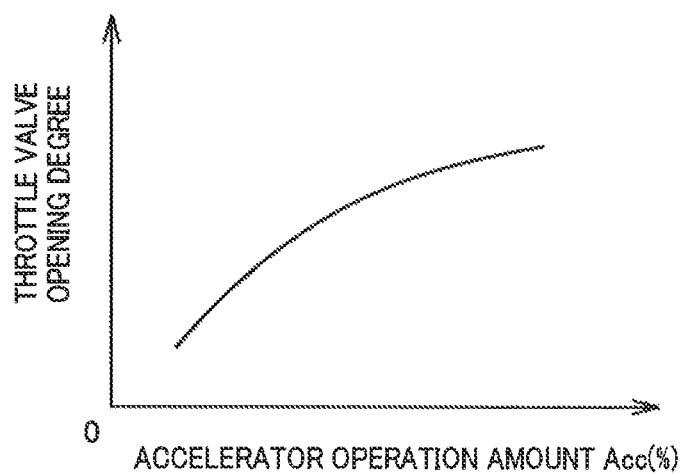
FIG. 5 is a diagram for explaining an example of control characteristics of a throttle valve opening degree relative to an accelerator operation amount, and the control characteristics being related to engine control of the hybrid vehicle of FIG. 1.

The sport running control means 88 controls the hybrid control means 82 and the shift control means 84 so as to run in the sport running mode with excellent running performance including the start acceleration performance if the sport running mode is selected by the sport mode switch 58. Specifically, at least the motor running mode is inhibited to cause the vehicle to run only in the engine running mode so that a large drive force from the engine 12 can promptly be acquired. Additionally, a shift line of the shift map of FIG. 4 may be changed toward the higher vehicle speed side than a normal state depicted in FIG. 4 to make an upshift more difficult and a downshift easier, so as to frequently use lower-speed-side gear stages at which a larger drive force can promptly be acquired. Although the output of the engine 12, i.e., a throttle valve opening degree, is defined by using the accelerator operation amount Acc as a parameter, for example, as depicted in FIG. 5, the control characteristics may be changed toward the higher throttle valve opening degree side than the normal state depicted in FIG. 5 such that larger output can be acquired from the same accelerator operation amount Acc. If the manual shift mode is selected in which the gear stage of the automatic transmission 20 can be changed by a driver's manual operation, it can be considered that the driver desires running with importance attached to the running performance including the start acceleration performance and, therefore, the same control as the case of selecting the sport running mode may be provided.

The large drive force running control means 90 functionally includes a transfer Lo running control means 92, a towing running control means 94, and a crawl running control means 96. The transfer Lo running control means 92 relates to the transfer Lo running mode when the transfer Lo is selected by the high/low switching switch 60; the towing running control means 94 relates to the towing running mode when the towing running mode is selected by the towing switch 62; the crawl running control means 96 relates to the crawl running mode when the crawl running mode is selected by the crawl switch 64; and in any of the running modes, the vehicle runs only in the engine running mode with the motor running mode inhibited. As a result, the vehicle runs in the engine running mode even in the lower load operation range of FIG. 4 in which the vehicle normally runs in the motor running mode so that a larger drive force from the engine 12 or the engine 12 and the motor generator MG can always promptly be acquired.

The towing running control means 94 changes a shift line of the shift map of FIG. 4 toward the higher vehicle speed side than a normal state depicted in FIG. 4 to make an upshift more difficult and a downshift easier, so as to frequently use lower-speed-side gear stages at which a larger drive force can promptly be acquired, and changes the control characteristics of the throttle valve opening degree depicted in FIG. 5 toward the higher throttle valve opening degree side than the normal state depicted in FIG. 5 such that larger output can be acquired from the same accelerator operation amount Acc. In the transfer Lo running mode by the transfer Lo running control means 92, the shift line and the control characteristics of the throttle valve opening degree may be changed as is the case with the towing running mode.

The crawl running control means 96 performing the crawl running mode automatically controls the engine 12, the motor generator MG, and the wheel brakes 72 without an accelerator operation and a brake operation of a driver for running at a low vehicle speed, for example, equal to or less than about 10 km/h while restraining wheels from spinning or locking, and the driver can concentrate on a steering operation and more easily perform the driving operation. Such a crawl running mode is particularly effective in the case of running under the condition making a proper accelerator or brake operation difficult, such as when a vehicle runs off-road such as sand, dirt, and rocky roads or runs on a slippery road surface such as snowy and frozen roads.

Figure 6:
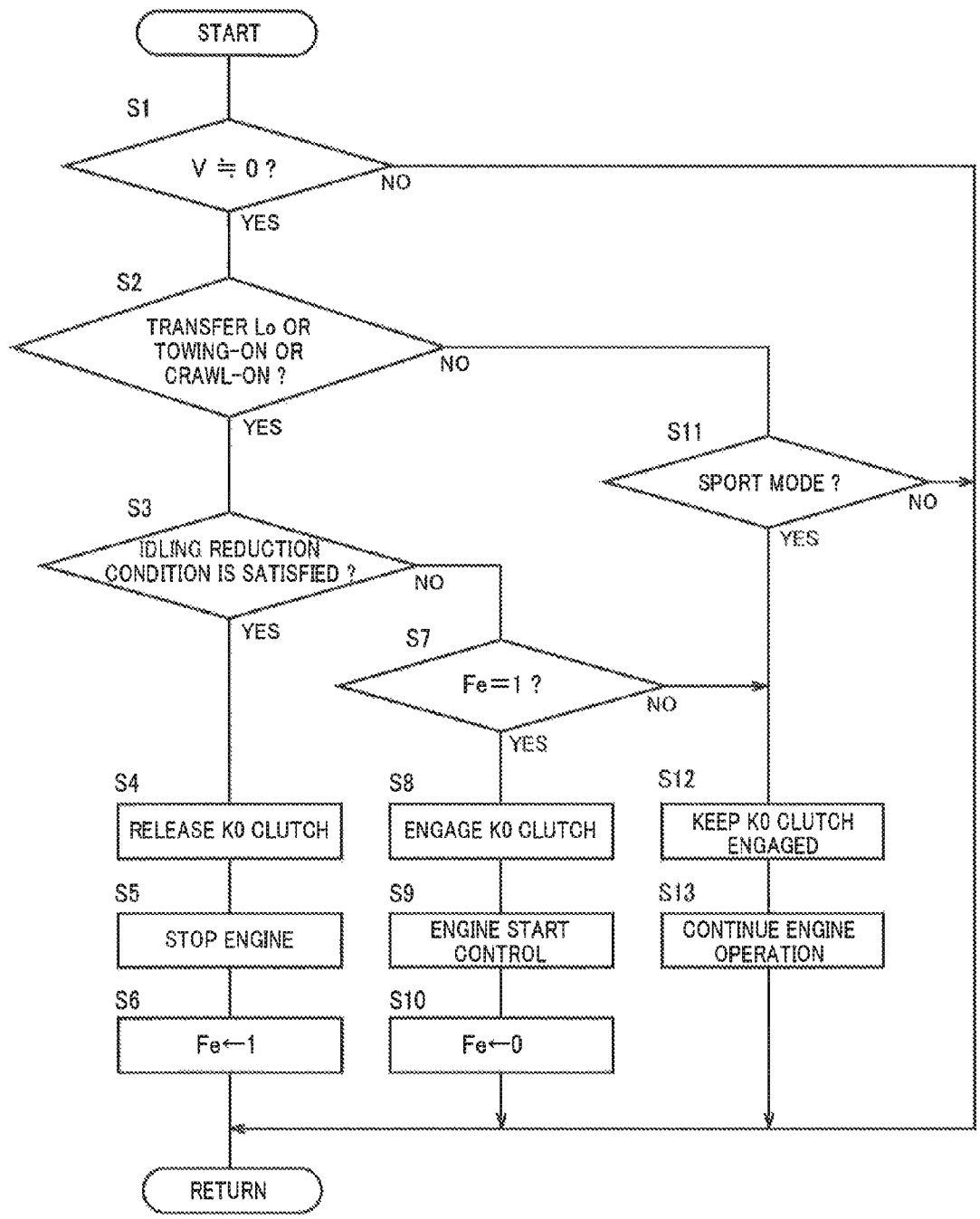
FIG. 6 is a flow chart for explaining an operation of a vehicle stop time control means functionally included in an electronic control device of FIG. 1.

The vehicle stop time control means 98 relates to engine control at the time of vehicle stop during running in the sport running mode performed by the sport running control means 88, during running in the transfer Lo running mode performed by the transfer Lo running control means 92, during running in the towing running mode performed by the towing running control means 94, or during running in the crawl running mode performed by the crawl running control means 96, and executes a signal process in accordance with a flowchart of FIG. 6.

At step S1 of FIG. 6, it is determined whether a vehicle is stopped with the vehicle speed V of substantially zero and, if V≈0 is not satisfied, the process is directly terminated, and if V≈0 is satisfied, step S2 or later is executed. At step S2, whether any of the transfer Lo running mode, the towing running mode, and the crawl running mode is performed for running and, if any of the running modes is performed for running, step S3 is executed. At step S3, it is determined whether a predefined idling reduction condition is satisfied and, if satisfied, the K0 clutch 34 is released at step S4 and the engine 12 is stopped at step S5. The idling reduction condition is satisfied, for example, when an accelerator is OFF (not operated) and a brake is ON (in braking operation). Even during the engine stop, the motor generator MG is rotated at a predetermined rotation speed to generate a predetermined creep torque and a predetermined oil pressure is output by the mechanical oil pump 32. At next step S6, an engine stop flag Fe is set to "1" indicative of an engine stop.

If the determination of step S3 is NO (negative), i.e., if the idling reduction condition is not satisfied, step S7 is executed. For example, this corresponds to when a brake operation is not performed by a driver during coasting etc., or when a brake operation is cancelled to start a vehicle from a stopped state, and it is determined at step S7 whether the engine stop flag Fe is "1". In the case of Fe=1, i.e., at the time of vehicle start from the vehicle stop state while the engine 12 is stopped, the K0 clutch 34 is engaged at step S8 to crank the engine 12 while the engine start control such as fuel injection is provided at step S9 to start the engine 12, so as to use the drive force of the engine 12 for the vehicle start. Since the motor generator MG is rotationally driven at a predetermined rotation speed even during engine stop, the engine rotation speed NE is promptly raised in accordance with engagement of the K0 clutch 34 for starting the engine so that the drive force from the engine 12 can be promptly acquired. However, strictly speaking, for example, on a flat road etc., the vehicle start is initiated by the rotation of the motor generator MG in accordance with brake-off and the drive force from the engine 12 is added in accordance with the start of the engine 12. At next step S10, the engine stop flag Fe is set to "0".

If the determination at step S7 is NO (negative), i.e., if the engine 12 is in the operating state and the idling reduction condition is not satisfied, step S12 and step S13 are executed to maintain the K0 clutch 34 in the engaged state while the engine 12 is maintained in a predetermined operating state such as an idling state. As a result, at the time of vehicle start due to a depressing operation of the accelerator pedal etc., the drive force is promptly acquired from the engine 12 maintained in the operating state, thereby ensuring high responsiveness at the time of vehicle start.

If the determination at step S2 is NO (negative), i.e., if none of the transfer Lo running mode, the towing running mode, and the crawl running mode is performed, it is determined at step S11 whether the sport running mode is performed. If the sport running mode is not performed, the process is directly terminated and, if the sport running mode is performed, steps S12 and S13 described above are executed to maintain the K0 clutch 34 in the engaged state while the engine 12 is maintained in a predetermined operating state such as an idling state. As a result, at the time of vehicle start due to a depressing operation of the accelerator pedal etc., the drive force is promptly acquired from the engine 12 maintained in the operating state, thereby ensuring high responsiveness at the time of vehicle start.

As described above, in the hybrid vehicle 10 of this example, during running in the predefined large drive force running mode in which a drive force larger than usual is required although a requirement for start acceleration performance is low, or specifically, in any of the transfer Lo running mode, the towing running mode, and the crawl running mode, the engine running mode is performed in the operation range in which the motor running mode is normally performed and, therefore, a large drive force from the engine 12 is smoothly acquired and a driving operation is facilitated when a large drive force is required. At the time of vehicle stop in these large drive force running modes, the engine 12 is stopped on the satisfaction of the idling reduction condition and, therefore, fuel efficiency is improved. Since the engine 12 is stopped, a time until the acquisition of the large drive force from the engine 12 is elongated by an engine start time at the subsequent vehicle start; however, since the requirement for the start acceleration performance is low, it is unlikely to be against a driver's intention or to give a feeling of discomfort, and the driving operability and the fuel efficiency can properly be satisfied at the same time during the large drive force running mode.

In this example, at the time of vehicle start from the vehicle stop state with the engine 12 stopped in the large drive force running mode, the engine 12 is immediately started to use the drive force of the engine 12 for the vehicle start and, therefore, although a response delay exists until the start of the engine 12, the large drive force from the engine 12 can promptly be acquired and the driving operation is facilitated.

In this example, since the K0 clutch 34 is released to stop the engine 12 at the time of vehicle stop in the large drive force running mode and the K0 clutch 34 is engaged to crank and start the engine 12 while the motor generator MG is rotational driven at the time of vehicle start, the engine rotation speed NE can promptly be raised for starting the engine, and the deterioration in the start acceleration performance can be suppressed to the minimum while the improvement in fuel efficiency is realized by the engine stop.

In this example, since the running performance oriented running mode with a higher requirement for the start acceleration performance, or specifically, the sport running mode is included separately from the large drive force running mode and the K0 clutch 34 is maintained in the engaged state while the engine 12 is retained in the operating state at the time of vehicle stop in the sport running mode, the large drive force from the engine 12 is promptly acquired in accordance with an accelerator operation etc., and excellent start acceleration performance can be acquired. In other words, in the large drive force running mode with a lower requirement degree for the start acceleration performance, the large drive force from the engine 12 is promptly acquired through the engine running mode and the engine 12 is stopped at the time of vehicle stop to achieve an improvement in fuel efficiency, while in the running performance oriented sport running mode with a higher requirement degree of the start acceleration performance, the large drive force from the engine 12 is promptly acquired through the engine running mode and the engine 12 is retained in the operating state even at the time of vehicle stop, and therefore, excellent running performance matching the driver's intention is acquired, including the start acceleration performance.

Second Example

Another example of the present invention will be described. In the following example, the portions substantially common with the example are denoted by the same reference numerals and will not be described in detail.

A hybrid vehicle 200 of FIG. 7 is different in that an electric oil pump 202 is included instead of the mechanical oil pump 32 as compared to the hybrid vehicle 10 of the example. In this case, the vehicle stop time control means 98 executes a signal process in accordance with a flowchart of FIG. 8. The flowchart of FIG. 8 is different from FIG. 6 in that steps S4-1 and S8-1 are executed instead of steps S4 and S8 and that step S5-1 is newly included between steps S5 and S6.

Specifically, if the idling reduction condition is satisfied at step S3, while the K0 clutch 34 is maintained in the engaged state at step S4-1, steps S5 and S5-1 are executed to stop the engine 12 and stop the motor generator MG. Since the electric oil pump 202 is included in this example, even if the motor generator MG is stopped, an oil pressure from the electric oil pump 202 can be used for maintaining the K0 clutch 34 in the engaged state and for engaging a predetermined hydraulic friction engagement device in the automatic transmission 20 to maintain a predetermined gear stage such as the first gear stage. If the determination of step S7 is YES (affirmative), i.e., at the time of vehicle start from the vehicle stop state with the engine 12 stopped, the motor generator MG is rotationally driven at step S8-1 to crank the engine 12, and the engine start control such as fuel injection is provided at step S9 to start the engine 12, so as to use the drive force of the engine 12 for the vehicle start. Since the K0 clutch 34 is maintained in the engaged state even in the vehicle stop state, the engine 12 can be cranked and started simply by rotationally driving the motor generator MG and the shift to the engine running mode can directly be made. Also in this example, strictly speaking, the vehicle start is initiated by rotationally driving the motor generator MG and the drive force from the engine 12 is added in accordance with the start of the engine 12.

Also in this example, the same actions and effects can be obtained as the example. That is, at the time of vehicle stop in the large drive force running mode, the engine 12 is stopped on the satisfaction of the idling reduction condition and, therefore, the driving operability and the fuel efficiency can properly be satisfied at the same time during the large drive force running mode. In this example, sine the engine 12 is stopped with the K0 clutch 34 engaged at the time of vehicle stop in the large drive force running mode and the motor generator MG is rotationally driven with the K0 clutch 34 engaged to crank and start the engine 12 at the time of vehicle start, the control is easier than the case of providing the start control of the engine 12 while the K0 clutch 34 is connected as in the example, and the shift to the engine running mode can smoothly be made. Particularly, since the K0 clutch 34 is maintained in the engaged state from a vehicle stop to a vehicle start in this example, the engine 12 can immediately be cranked by the motor generator MG in accordance with an engine start instruction (the unsatisfied idling reduction condition) associated with brake-off etc., and the responsiveness at the time of engine start is improved.

Although the examples of the present invention have been described in detail with reference to the drawings, these examples are merely an embodiment and the present invention may be implemented in variously modified and improved forms based on the knowledge of those skilled in the art.

NOMENCLATURE OF ELEMENTS 10, 200: hybrid vehicle 12: engine transfer for front/rear-wheel distribution 34: K0 clutch (engine connecting/disconnecting device) 72: wheel brakes 80: electronic control device 88: sport running control means (running performance oriented running mode) 90: large drive force running control means (large drive force running mode) 92: transfer Lo running control means (transfer Lo running mode) 94: towing running control means (towing running mode) 96: crawl running control means (crawl running mode) 98: vehicle stop time control means 110: auxiliary transmission MG: motor generator (electric motor)

The invention claimed is:

1. A control device of a hybrid vehicle including an electric motor and an engine as drive force sources, the hybrid vehicle being configured to execute engine running using the engine as the drive force source for running and motor running using the electric motor as the drive force source for running with the engine stopped,
   the control device having:
   a predefined running performance oriented running mode including a sport running mode; and
   a predefined large drive force running mode in which a lower degree of start acceleration performance is required than in the running performance oriented running mode,
   in the predefined running performance oriented running mode, the motor running being inhibited, the engine running being performed in an operation range in which the motor running is normally performed, and the engine being retained in an operating state at the time of vehicle stop, and
   in the predefined large drive force running mode, the motor running being inhibited, the engine running being performed in the operation range in which the motor running is normally performed, and the engine being stopped at the time of vehicle stop.

2. The control device of a hybrid vehicle of claim 1, wherein
   the large drive force running mode includes at least one of a transfer Lo running mode in which a Hi-Lo switchable auxiliary transmission disposed in a front/rear-wheel distribution transfer is set to Lo, a towing running mode of running for towing a towed vehicle, and crawl running mode of automatically controlling the engine and wheel brakes for running without an accelerator operation and a brake operation of a driver.

3. The control device of a hybrid vehicle of claim 1, wherein
   at the time of vehicle start from a vehicle stop state with the engine stopped in the large drive force running mode, the engine is started to use a drive force from the engine for the vehicle start.

4. The control device of a hybrid vehicle of claim 1, comprising an engine connecting/disconnecting device decoupling the engine from a drive force transmission path, wherein the electric motor is disposed closer to the drive force transmission path than the engine connecting/disconnecting device, wherein the engine connecting/disconnecting device is connected during the engine running, wherein
   at the time of vehicle stop in the large drive force running mode, the engine connecting/disconnecting device is interrupted and the engine is stopped, and wherein at the time of vehicle start, the engine connecting/disconnecting device is connected while the electric motor is rotationally driven to crank and start the engine.

5. The control device of a hybrid vehicle of claim 1, comprising an engine connecting/disconnecting device decoupling the engine from a drive force transmission path, wherein the electric motor is disposed closer to the drive force transmission path than the engine connecting/disconnecting device, wherein the engine connecting/disconnecting device is connected during the engine running, wherein
   at the time of vehicle stop in the large drive force running mode, the engine is stopped with the engine connecting/disconnecting device kept connected, and wherein at the time of vehicle start, the electric motor is rotationally driven with the engine connecting/disconnecting device connected to crank and start the engine.

6. The control device of a hybrid vehicle of claim 5, wherein
   at the time of vehicle stop in the large drive force running mode, the engine connecting/disconnecting device is maintained in a connected state until the time of vehicle start.

* * * * *